United States Patent [19]

Billieres

[11] Patent Number: 5,688,345
[45] Date of Patent: Nov. 18, 1997

[54] TIRE WITH RADIAL CARCASS WITH OUTSIDE TO INSIDE TURN-UPS

[75] Inventor: Jean Billieres, Clermont-Ferrand, France

[73] Assignee: Compagnie Generale Des Etablisse-ments Michelin-Michelin & Cie, Clermont-Ferrand Cedex, France

[21] Appl. No.: 619,495
[22] PCT Filed: Sep. 7, 1994
[86] PCT No.: PCT/EP94/02982
§ 371 Date: Mar. 15, 1996
§ 102(e) Date: Mar. 15, 1996
[87] PCT Pub. No.: WO95/09090
PCT Pub. Date: Apr. 6, 1995

[30] Foreign Application Priority Data

Sep. 30, 1993 [FR] France ................ 93/11825

[51] Int. Cl.⁶ ............ B60C 15/00; B60C 15/024; B60C 15/04; B60C 15/06
[52] U.S. Cl. ............ 152/540; 152/539; 152/542; 152/543; 152/552; 152/553
[58] Field of Search .................. 152/552, 553, 152/540, 542, 543, 529

[56] References Cited

U.S. PATENT DOCUMENTS 4,185,676  1/1980  Raluy.
4,580,610  4/1986  Jackson.
4,794,968  1/1989  Griffiths et al..
5,070,921  12/1991  Wada et al..

*Primary Examiner*—Adrienne C. Johnstone
*Attorney, Agent, or Firm*—Brumbaugh, Graves, Donohoe & Raymond

[57] ABSTRACT

In a tire having an aspect ratio H/S of less than 0.8 the radial carcass reinforcement (1) is wound in each bead (B) around an anchoring bead ring (2) going from the outside to the inside to form a turn-up (10), the turn-up being located on the inside of an angle α, open axially towards the inside and radially towards the outside of at most 45° and defined by two straight lines $OD_1$ and $OD_2$ tangent to the circle circumscribed around the anchoring bead ring (2), the straight line closest to the axis of rotation of the tire being parallel to the axis.

5 Claims, 1 Drawing Sheet

TIRE WITH RADIAL CARCASS WITH OUTSIDE TO INSIDE TURN-UPS

BACKGROUND OF THE INVENTION

The present invention relates to a tubeless tire with radial carcass reinforcement, intended more particularly for equipping heavy vehicles such a trucks, buses, pneumatic-tired subways, and tractor-trailer units.

Such tires are mounted on two types of rims: so-called drop-center rims having frustoconical seats inclined with respect to the axis of rotation and forming with the axis an angle which may vary from 5° to 15°, and flat or substantially flat rims having seats inclined by 0° or 5° with respect to the axis of rotation.

So-called drop-center rims have a mounting groove the diameter of which is definitely smaller than the normal diameter of the rim. This inside diameter of the rim is considered by the users to be too small and it does not permit selecting brake drums of dimensions suitable for an effective braking of increasingly more powerful vehicles.

It is therefore highly desirable to increase the diameter of the rim base, and do so insofar as possible without increasing the overall diameter of the rolling assembly, which means decreasing the aspect ratio H/S of the tire, H being the height of the tire on the rim and S its maximum axial width.

In other cases, it is advantageous to decrease the overall diameter of the rolling assembly formed of the tire and the rim without decreasing the diameter of the rim and, in particular, for the purpose of lowering the center of gravity of trailers or semi-trailers. A tire whose aspect ratio H/S decreases while retaining substantially the standard maximum axial width represents one solution to the above problem.

The development of heavy vehicle tires with aspect atios of less thin 0.8 is very difficult. In particular, the life of the beads clearly becomes less as the ratio H/S decreases, the insufficiencies in life being located, in particular, at the level of the ends of the turn-ups of the carcass reinforcement or the ends of the reinforcement plies located in the beads of the tire, the architecture of the beads being an ordinary architecture with, in each bead, a carcass reinforcement turn-up and reinforcement plies the meridian profiles of which are substantially parallel to the meridian profile of the carcass reinforcement in the region of the beads. Furthermore, such an architecture results in a substantial lack of comfort, which is entirely unacceptable for long runs on more or less bumpy roads.

EP 077 161 describes a tire carcass reinforcement which is wound from the outside to the inside of said bead ring and an elastic annular element of rubber placed axially and radially on the inside of the bead ring. In order that the bead, and more particularly, the annular element, can, by rotation around the bead ring, place the carcass reinforcement under tension, the bead seat is more inclined with respect to a parallel to the axis of rotation than the rim seat.

SUMMARY OF THE INVENTION

The invention proposes to remedy these drawbacks, and it concerns a tire having a ratio of less than 0.8 and a radial carcass reinforcement radially over which there is a crown reinforcement, the carcass reinforcement being formed of at least one ply of cords or cables and being wound in each bead around an anchoring bead ring going from the outside to the inside in order to form a turn-up, characterized by the fact that the turn-up is located on the inside of an angle a, open axially towards the inside and radially towards the outside, of at most 45° and defined by two straight lines $OD_1$ and $OD_2$ tangent to the circle circumscribed around the anchoring bead ring, the straight line closest to the axis of rotation being parallel to the axis.

The meridian profile of the turn-up may be linear; it is preferably curved with a single radius of curvature and a center of curvature located radially towards the inside. Likewise, this meridian profile, axially at the level of the end of the turn-up, will be tangent to a parallel to the axis of rotation.

It is also advantageous for the carcass reinforcement turn-up to be reinforced by the presence of an additional reinforcement armature, formed of at least one ply composed of metal or textile cords or cables. In the case of a single ply, this ply can be placed either radially to the outside or to the inside of the turn-up. In the case of two reinforcement plies, they will preferably be arranged on opposite sides of the turn-up. The reinforcement plies will advantageously be formed of metal cables, directed with respect to the circumferential direction at an angle of between 0° and 30°, the value 0° being included in the range.

It is likewise advantageous to provide axially to the outside of the carcass reinforcement, at the level of the rim flange, an additional reinforcement armature formed of at least one reinforcement ply, composed of metal or textile cords or cables directed at an angle of between 0° and 30° with respect to the circumferential direction.

While it is usual to understand that any armature, and therefore a carcass reinforcement turn-up or a reinforcement ply, comprises not only the reinforcement elements but also the vulcanized rubber mix which surrounds them, known as calendering mix, the amount of rubber arranged on or below the cords or cables being generally of slight thickness, it is advantageous, within the scope of the invention, for the carcass reinforcement turn-up and the additional reinforcement armature to be arranged in the same annular portion of the tire, which portion protrudes with respect to the usual meridian profile of the inside of the tire, the protuberance having a cross section with a radial dimension or thickness which increases axially from the inside to the outside, having its smallest thickness at the level of the end of the carcass reinforcement turn-up and its greatest thickness at the level of the junction with the bead.

DESCRIPTION OF THE DRAWING

Referring to the accompanying drawing which contains only a single figure, a non-limitative example of the invention will be described. The figure is a diagrammatic view in meridian section of a tire bead, mounted on its rim seat.

DESCRIPTION OF PREFERRED EMBODIMENT

Figure 1:
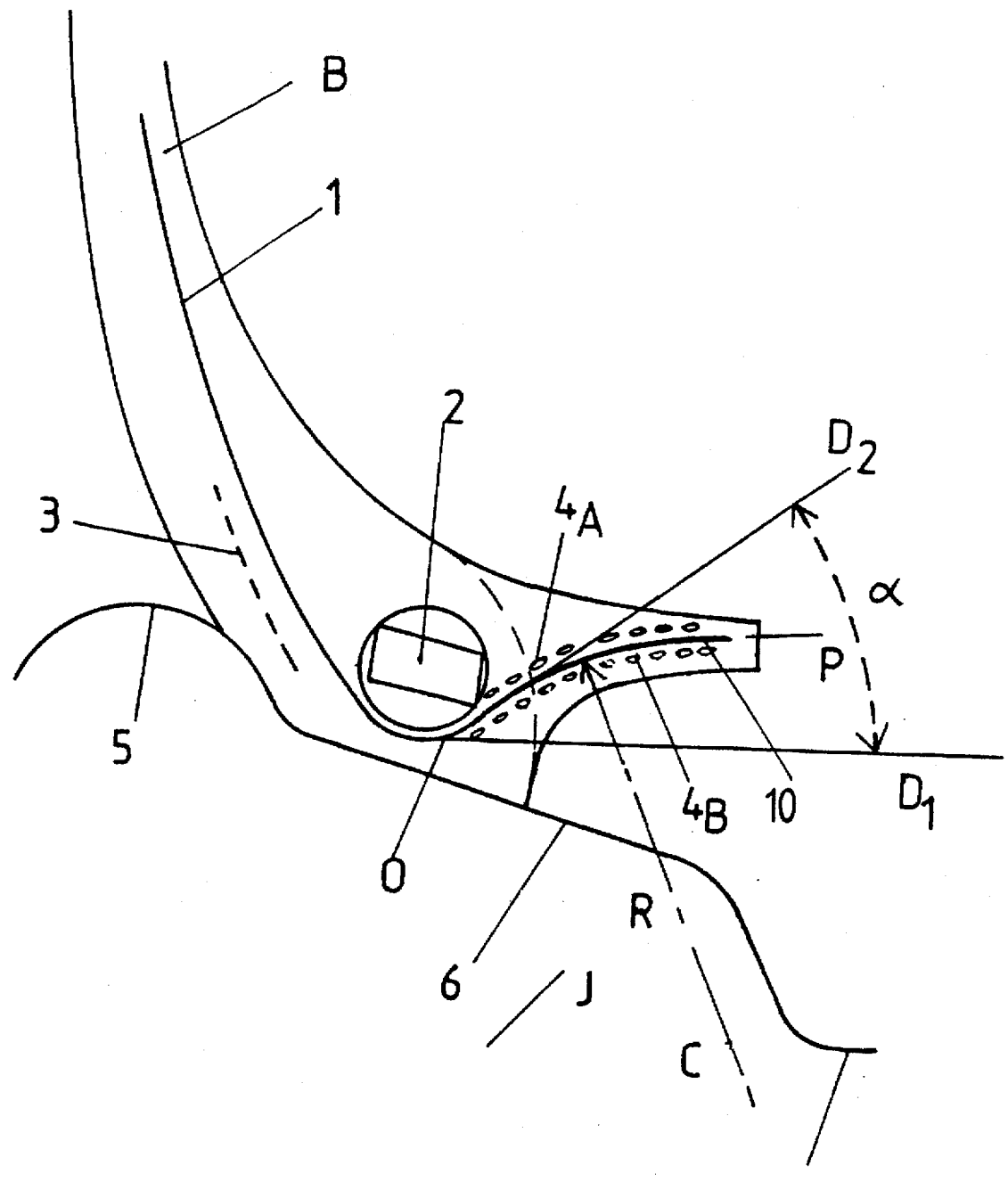

A tire of size 295/60 R 22.5 X is mounted on its service rim J, formed on each side by a rim flange 5 extended axially towards the inside of a rim seat 6, the frustoconical generatrix of which forms an angle of 15° with a parallel to the axis of rotation, the two rim seats being connected to a rim base having a mounting groove 7. On each side of the rim J there is mounted a bead B of the tire in question. In the bead, the carcass reinforcement 1, composed of a single metal ply, is turned up around a bead ring 2 having rectangular wires, the ply going from the outside to the inside in order to form a turn-up 10.

This turn-up 10 has a meridian profile which is located entirely between the two straight lines $OD_1$ and $OD_2$, the straight line $OD_1$ being parallel to the axis of rotation and forming with the straight line $OD_2$ an angle α open towards the inside which is equal to 40°, the straight lines $OD_1$ and $OD_2$ being tangent to the circle circumscribed around the bead ring 2.

The meridian profile of the turn-up 10 is curved with a single radius of curvature R and a center of curvature C located radially to the inside. This meridian profile at the level of the end of the turn-up 10 is tangent to a parallel to the axis of rotation; in other words, the curve representing the meridian profile tends towards an asymptote parallel to the axis of rotation.

On and below the turn-up 10 there is arranged a ply 4A, 4B of metal cables forming an angle of zero with the circumferential direction. As to the carcass reinforcement 1 radially at the level of the rim flange 5, it is reinforced by the presence, axially to the outside, of a reinforcement ply 3 of metal cables directed at an angle equal to 20° with respect to the longitudinal direction.

The turn-up 10 and the two plies 4A and 4B are arranged in a rubber composition protuberance P axially to the inside, the meridian cross section of which has a slight thickness axially at the level of the end of the turn-up 10, which increases substantially uniformly towards the junction (shown in dotted line) with the inner meridian profile of the tire.

A tire such as described is advantageously manufactured by a method of manufacture such as described in the international application published under No. WO 95/00322.

I claim:

1. A tire having an aspect ratio of less than 0.8 and having a radial carcass reinforcement (1) surmounted radially by a crown reinforcement, the carcass reinforcement (1) being formed of at least one ply of cords or cables and being wound in each bead (B) around an anchoring bead ring (2), going from the outside to the inside in order to form a turn-up (10), characterized by the fact that the said turn-up (10) is located to the inside of an angle α, open axially toward the inside and radially toward the outside, of at most 45° and defined by two straight lines $OD_1$ and $OD_2$ tangent to the circle circumscribed round the anchoring bead ring (2), the straight line closest to the axis of rotation of the tire being parallel to said axis.

2. A tire according to claim 1, characterized by the fact that the meridian profile of the turn-up (10) is linear.

3. A tire according to claim 1, characterized by the fact that the meridian profile of the turn-up (10) is curved with a single radius of curvature R and a center of curvature C located radially towards the inside, said profile becoming parallel to the axis of rotation at the end of the turn-up (10).

4. A tire according to claim 1, characterized by the fact that the turn-up (10) is reinforced by the presence of at least one additional reinforcement ply (4A, 4B) of cables directed at an angle of between 0° and 30° with respect to the circumferential direction.

5. A tire according to claim 4, characterized by the fact that the turn-up (10) of the carcass reinforcement (1) and the at least one additional reinforcement ply (4A and 4B) are arranged in the same annular portion of rubber which protrudes with respect to the meridian profile of the inner cavity of the tire.

* * * * *

UNITED STATES PATENT AND TRADEMARK OFFICE
CERTIFICATE OF CORRECTION

PATENT NO.   : 5,688,345
DATED        : Nov. 18, 1997
INVENTOR(S)  : Billieres

It is certified that error appears in the above-indentified patent and that said Letters Patent is hereby corrected as shown below:

Col. 1, line 17, "normal" should read --nominal--;
       line 35, "atios" should read --ratios--;
       line 61, "a ratio" should read --a aspect ratio--;
       line 67, "angle a" should read --angle α--.

Col. 4, line 12, "round" should read --around--.

Signed and Sealed this

Seventh Day of July, 1998

Attest:

BRUCE LEHMAN

*Attesting Officer*    *Commissioner of Patents and Trademarks*